United States Patent [19]

Deakins et al.

[11] Patent Number: 4,883,500

[45] Date of Patent: Nov. 28, 1989

[54] SAWBLADE SEGMENTS UTILIZING POLYCRYSTALLINE DIAMOND GRIT

[75] Inventors: Martin E. Deakins, Dublin; David E. Slutz, Worthington; Neil R. Johnson, Columbus; Thomas J. Clark, Powell; Harold P. Bovenkerk, Worthington, all of Ohio

[73] Assignee: General Electric Company, Worthington, Ohio

[21] Appl. No.: 262,405

[22] Filed: Oct. 25, 1988

[51] Int. Cl.[4] .................... C09K 3/14

[52] U.S. Cl. .................... 51/298; 51/295; 51/308; 51/309

[58] Field of Search .................... 51/206 R, 295, 298, 51/308, 309

[56] References Cited

U.S. PATENT DOCUMENTS

| | | | |
|---|---|---|---|
| Re. 25,434 | 8/1963 | Christensen | 51/206 R |
| 3,128,755 | 4/1964 | Benson | 51/206 R |
| 3,338,230 | 8/1967 | Lindblad | 51/206.4 |
| 3,863,401 | 2/1975 | Schwarzkopf et al. | 51/206.4 |
| 4,212,137 | 7/1980 | Rue | 51/298 |
| 4,246,004 | 1/1981 | Busch et al. | 51/298 |
| 4,337,750 | 7/1982 | Dutcher | 51/206 R |
| 4,505,251 | 3/1985 | Stoll | 51/206 R |
| 4,739,745 | 4/1988 | Browning | 51/206 R |
| 4,776,861 | 10/1988 | Frushour | 51/298 |

*Primary Examiner*—Paul Lieberman
*Assistant Examiner*—Willie J. Thompson
*Attorney, Agent, or Firm*—Gary L. Loser

[57] ABSTRACT

The present invention provides saw blade segments comprising polycrystalline diamond cutting elements and single crystal diamond cutting elements dispersed in a bonding matrix. In a preferred embodiment abrasion resistant particles are included so as to cause non-uniform wearing of the cutting segments. In another aspect of the invention, cutting segments are provided which utilize surface set polycrystalline diamond cutting elements larger than mesh size 18.

18 Claims, 2 Drawing Sheets

SAWBLADE SEGMENTS UTILIZING POLYCRYSTALLINE DIAMOND GRIT

BACKGROUND OF THE INVENTION

The present invention generally relates to saw blades of the kind used for sawing hard and/or abrasive materials such as granite, marble, concrete, asphalt and the like. More particularly, the present invention relates to saw blade cutting segments containing thermally stable, polycrystalline diamond abrasive grit as the cutting elements.

Conventionally, the cutting of hard materials such as granite, marble, filled concrete, asphalt and the like is achieved with the use of diamond saws. The blade of a saw of this type comprises a circular steel disc having a plurality of segments spaced consists essentially of diamond abrasive bonded in a suitable alloy or metal matrix, such as bronze or cobalt, for example. The diamond abrasive typically is either a single crystal natural diamond or a single crystal synthetic diamond.

Such prior art saw blades suffer from several disadvantages, including the tendency of such single crystal diamonds to wear smooth or to fracture completely through the crystal during use. It is possible to control these shortcomings to a certain extent by proper selection of the bond matrix and blade operation conditions, particularly surface speed of the saw blade. Another approach to avoiding these disadvantages is through the design of the saw blade and/or the saw blade segment.

More recently, U.S. Pat. No. 4,776,861, assigned to the same assignee of the present invention, suggested that thermally stable polycrystalline diamond abrasive grit could be utilized in the manufacture of saws, however, this patent gives no guidance as to how such diamond grit should be incorporated into the saw blade segments. Furthermore, there is no teaching or suggestions that any advantage can be obtained over prior art saw blades using single crystal diamonds by employing thermally stable polycrystalline diamond abrasive grit.

SUMMARY OF THE INVENTION

It is an object of the present invention to provide saw blade segments whose diamond cutting particles resist gross fracture.

It is another object of the present invention to provide saw blade segments whose diamond cutting elements generate new cutting edges during use.

Still another object of the present invention is to provide saw blade segments which allow the saw blade to operate at higher surface speeds.

Yet another object of the present invention is to provide saw blade segments whose bond matrix wears away at about the same rate as the diamond cutting elements.

In accordance with the foregoing objects, there are provided cutting segments for use on saw blades which contain an effective amount of thermally stable polycrystalline diamond abrasive grit.

In a particularly preferred embodiment of the present invention, there are provided cutting segments which contain an effective amount of thermally stable polycrystalline diamond abrasive grit as the cutting elements and an amount of abrasion resistant particles effective for causing non-uniform wearing of said cutting segments.

DESCRIPTION OF THE INVENTION

In one aspect, the present invention provides cutting segments for saw blades comprising an effective amount of thermally stable polycrystalline diamond dispersed in a bonding matrix. Such thermally stable polycrystalline diamond particles may vary in size from about 400 mesh or less to about 10 mesh or more, with particles in the range of 100 mesh to 10 mesh being preferred, and particles in the range of 10 mesh to 50 mesh being particularly preferred.

Especially preferred thermally stable polycrystalline diamond particles are of the type described in U.S. Pat. No. 4,224,380, assigned to the same assignee as the present invention and incorporated herein by reference. Briefly, such polycrystalline diamond comprises (i) between about 70 volume percent and 95 volume percent of self-bonded diamond particles, (ii) a metallic phase infiltrated substantially uniformly through out said component, said phase comprising between about 0.05% and 3% by volume of a catalytic metal or alloy, and (iii) a network of interconnected empty pores dispersed through said polycrystalline diamond.

Alternatively, such network of interconnected pores can be infiltrated with a material having a coefficient of thermal expansion about equal to that of diamond, for example, silicon or silicon carbide.

The present invention preferably employs metal coated polycrystalline diamond, for example, as described in U.S. Pat. No. 4,738,689, assigned to the same assignee as the present invention and incorporated herein by reference. The use of such a coating provides greater retention in the matrix material and protects against thermal damage during high temperature matrix fabrication.

It is contemplated that the thermally stable polycrystalline diamond particles may be used alone or in combination with single crystal diamonds. An embodiment wherein such a combination would be especially desirable can be found in U.S. patent application Ser. No. 236,580, filed Aug. 25, 1988, which is assigned to the same assignee as the present invention and incorporated herein by reference. According to this disclosure, cutting blade segments are provided which comprise diamond cutting elements and abrasion resistant particles which cause the segments to wear non-uniformly in a suitable bonding matrix.

Figure 1:
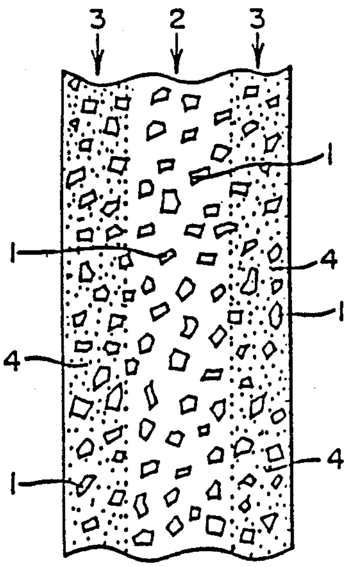
FIG. 1 is a front elevation view of a portion of a preferred embodiment of a saw blade of the present invention.
Figure 2:
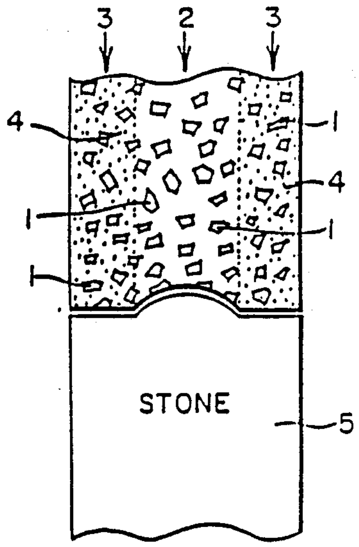
FIG. 2 is a front elevation view of the interface created between the saw blade segment illustrated in FIG. 1 and a stone workpiece during the sawing operation.

As can be seen in FIG. 1, the concentration of diamond cutting elements 1 in the center section 2 is preferably about the same as the concentration of diamond cutting elements 1 in the side sections or matrices 3. It should be appreciated, however, that a larger or smaller concentration of such diamond cutting elements can be employed in either center section 2 or side sections 3 without departing from the spirit or intended scope of the invention. For example, it is expected that in some applications it may be desirable that the concentration of diamond cutting elements 1 in the center section 2 be greater than the concentration of diamond cutting elements 1 in the side sections 3. The most important consideration is that a non-uniform cutting rate be achieved by including an effective amount of abrasion resistant particles 4 in side sections 3. Saw blade segments manufactured with abrasion resistant particles 4 in side sections 3 will exhibit concave wear and will form a ridge on stone workpiece 5 as shown in FIG. 2.

Any suitable particles may be used as the abrasion resistant particles 4; however, it has been found that diamond, CBN and tungsten carbide particles are particularly effective.

In accordance with the present invention, the diamond cutting elements 1 may comprise a mixture of thermally stable polycrystalline diamond particles and single crystal diamond particles. alternatively, the diamond cutting elements 1 in center section 2 can be polycrystalline diamond particles and the diamond cutting elements 1 in side sections 3 can be single crystal diamond particles. Similarly, the diamond cutting elements 1 in center section 2 can be single crystal diamonds and the diamond cutting elements 1 in side sections 3 can be polycrystalline diamond particles.

Still another variation of the foregoing which is contemplated by the present invention is to include both polycrystalline and single crystal diamond particles in center section 2 and side sections 3, but vary their respective concentrations in either or both sections so as to obtain optimum performance. Thus, center sections 2 and side sections 3 may have the same concentration of single crystal diamond particles while having different concentrations of polycrystalline diamond particles or vice versa. Other variations will be apparent to those of ordinary skill in the art.

It is, of course, also possible to vary the mesh size of the various diamond particles within the foregoing possible combinations of diamond particle concentrations. The optimal combination for a particular application can readily be ascertained by the artisan without undue experimentation.

The foregoing can be summarized by the following table.

TABLE I

| Center Section | Side Sections |
|---|---|
| single crystal | polycrystalline |
| single crystal | single crystal/polycrystalline |
| polycrystalline | single crystal |
| polycrystalline | polycrystalline |
| polycrystalline | single crystal/polycrystalline |
| single crystal/polycrystalline | single crystal |
| single crystal/polycrystalline | polycrystalline |
| single crystal/polycrystalline | single crystal/polycrystalline |

Concentrations and particle size can be varied over a broad range to achieve optimal results.

Figure 3:
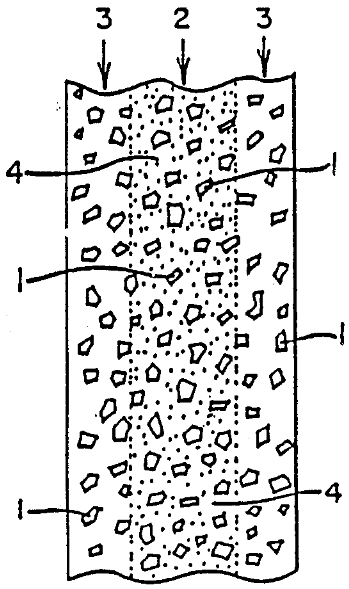
FIG. 3 is a front elevation view of an alternate embodiment of a saw blade segment of the present invention.
Figure 4:
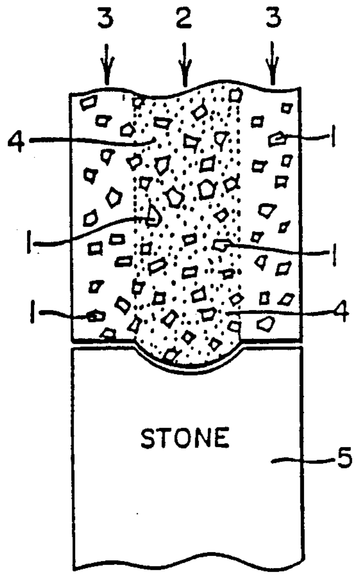
FIG. 4 is a front elevation view of the interface created between the saw blade segment illustrated in FIG. 2 and a stone workpiece during the sawing operation.

FIG. 3 shows an alternate embodiment of the invention wherein the abrasion resistant particles 4 are disposed in center section 2. With such an arrangement, convex wearing of the segment's surface results and a valley forms in workpiece 5, as illustrated in FIG. 4.

Any suitable concentration of diamond particles can be employed in the practice of the present invention. As a general guideline, the concentration should range from about 0.5 carats per cubic centimeter to about 2.5 carats per cubic centimeter.

The bonding matrix can be any conventional alloy or metal bonding matrix, for example, bronze, cobalt, cemented carbides or the like. Depending upon the end use, the bonding matrix may be an alternate material such as ceramic or molded plastic.

Figure 5:
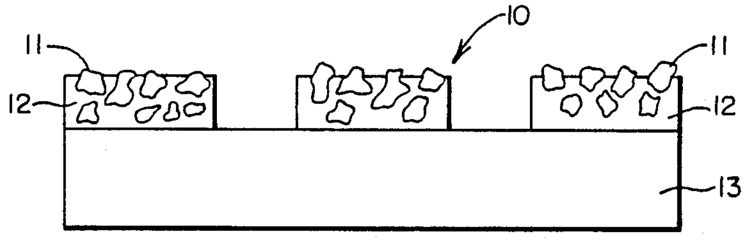
FIG. 5 is a side elevation view of surface set diamond cutting segments brazed to a saw blade core.

In another aspect, the present invention provides cutting segments or saw blades wherein thermally stable polycrystalline diamond particles larger than 18 mesh, preferably between 16 mesh and 10 mesh, are surface set in a suitable matrix. FIG. 5 illustrates one embodiment wherein diamond particles 11 are surface set into a bonding matrix 12 such as, for example, bronze, cobalt, cemented carbides and the like. Such surface setting of diamond particles 11 in bonding matrix 12 is a conventional technique in the manufacture of drill bits and can readily be adapted to the present invention. Segments 10 comprising diamond particles 11 surface set in bonding matrix 12 can be attached to a saw blade core 13 by conventional techniques such as brazing.

Figure 6:
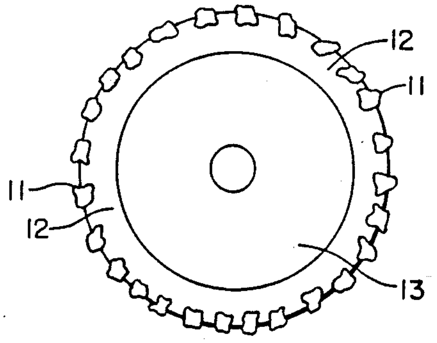
FIG. 6 is a side elevation view of surface set diamonds in an unsegmented saw blade.

FIG. 6 shows an alternate embodiment wherein the thermally stable polycrystalline diamond particles 11 are surface set in an unsegmented matrix 12 which circumscribes the entire core 13 of the saw blade. Of course, in certain applications it may be desirable to utilize a combination of surface set and impregnated cutting elements.

Figure 7:
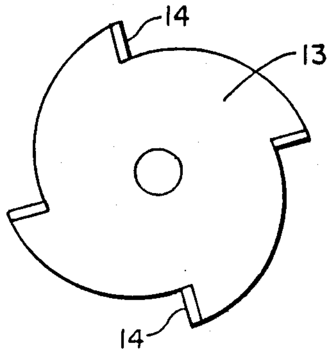
FIG. 7 is a side elevation view of an embodiment having diamond compacts brazed to a saw blade core.

FIG. 7 illustrates another embodiment of the invention in which thermally stable polycrystalline diamond compacts 14 are attached to the core 13 of the saw blade.

Segments manufactured in accordance with the present invention are adaptable for use in deep sawing applications, slabbing operations, cut-off operations, frame sawing, multi-blade sawing, wire sawing, belt saws, thina wall core drilling and various contour and shaping operations. Materials which can be cut with segments of the present invention include concrete, filled concrete, asphalt, marble, granite, limestone, sandstone, wood, metals, plastics and composites.

The present invention can also be practiced on any of the saw blade segment designs or saw blade designs known in the art. One such design is disclosed in U.S. Pat. No. Re. 25,434, which is incorporated herein by reference. Briefly, this disclosure describes a one piece preformed metallic supporting member having an outer end portion adapted to engage the work being cut and preformed abrasive members substantially harder than the supporting member brazed to opposite parallel sides of said outer portion and to said supporting member inwardly of said outer end portion, said abrasive members extending outwardly at least to the outer end of said end portion to engage the work being but, the abrasive members on one side of said outer portion being parallel to the abrasive members on the other side of said outer end portion.

Another such design is disclosed in U.S. Pat. No. 4,505,251, also incorporated herein by reference. This patent describes a conventional mixture of cement and diamonds along with a quantity of filler which is capable of withstanding the sintering process but which subsequently falls out so pores are provided. A typical segment is made with only the center porous, while the side sections are as dense as is conventional. The result is that the porous section can receive coolant and, in addition, it wears faster to yield a concave cutting edge.

U.S. Pat. No. 4,739,745 provides diamond saw blades comprising a plurality of slots and resultant projections at its periphery, and a plurality of "L" or "T" shaped cutting segments affixed alternatingly in line inversed to each other at the periphery of the saw blade core.

Other variations, modifications and rearrangements may be made without departing from the spirit or intended scope of the invention.

We claim:

1. A cutting segment for use in a saw blade, comprising thermally stable polycrystalline diamond cutting elements and single crystal diamond cutting elements dispersed in a bonding matrix.

2. A cutting segment as set forth in claim 1, wherein the thermally stable polycrystalline diamond cutting elements are from about 400 mesh to about 10 mesh.

3. A cutting segment as set forth in claim 2, wherein the thermally stable polycrystalline diamond cutting elements are from about 100 mesh to about 10 mesh.

4. A cutting segment as set forth in claim 3, wherein the thermally stable polycrystalline diamond cutting elements are from about 50 mesh to about 10 mesh.

5. A cutting segment as set forth in claim 4, wherein the thermally stable polycrystalline diamond cutting elements comprise between about 70 volume percent and 95 volume percent of self-bonded diamond particles; a metallic phase infiltrated substantially uniformly thoughout said component, said phase comprising about 0.05 percent and three percent by volume of metal or alloy catalyst; and a network of interconnected empty pores dispersed through said polycrystalline diamond.

6. A cutting segment as set forth in claim 5, wherein the interconnected empty pores are infiltrated with a material having a coefficient of thermal expansion about equal to that of diamond.

7. A cutting segment as set forth in claim 6, wherein the infiltrated material is silicon or silicon carbide.

8. A cutting segment as set forth in claim 1, wherein the thermally stable polycrystalline diamond cutting elements are coated.

9. A cutting segment as set forth in claim 7, wherein the thermally stable polycrystalline diamond cutting elements are coated with a metal, a metal carbide or a metal nitride.

10. A cutting segment for use in a saw blade, comprising thermally stable polycrystalline diamond cutting elements and an amount of abrasion resistant particles selected from the group consisting essentially of cubic boron nitride, tungsten carbide and mixture thereof effective for causing non-uniform wearing of said cutting segment, dispersed in a bonding matrix.

11. A cutting segment as set forth in claim 10, further comprising single crystal diamond cutting elements.

12. A cutting segment as set forth in claim 10, wherein the thermally stable polycrystalline diamond cutting elements are coated.

13. A cutting segment as set forth in claim 1 for use in a saw blade, comprising thermally stable polycrystalline diamond cutting elements larger than mesh size 19 disposed in a bonding matrix.

14. A cutting segment as set forth in claim 13, wherein the thermally stable polycrystalline diamond cutting elements are from 16 mesh to 10 mesh.

15. A cutting segment as set forth in claim 13, wherein the thermally stable polycrystalline diamond cutting elements are surface set.

16. A cutting segment as set forth in claim 13, wherein the thermally stable polycrystalline diamond cutting elements are coated.

17. A saw blade having the composition of claim 1 comprising thermally stable polycrystalline diamond cutting elements greater than mesh size 18 surface set in a bonding matrix.

18. A saw blade having the composition of claim 1 comprising thermally stable polycrystalline diamond cutting elements greater than mesh size 18 brazed to a saw blade core.

* * * * *